(12) United States Patent
Huang

(10) Patent No.: US 9,589,539 B2
(45) Date of Patent: Mar. 7, 2017

(54) ELECTRONIC DEVICE, METHOD, AND COMPUTER PROGRAM PRODUCT

(71) Applicant: Kabushiki Kaisha Toshiba, Minato-ku, Tokyo (JP)

(72) Inventor: Yusam Huang, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 77 days.

(21) Appl. No.: 14/559,784

(22) Filed: Dec. 3, 2014

(65) Prior Publication Data

US 2015/0309648 A1    Oct. 29, 2015

Related U.S. Application Data

(60) Provisional application No. 61/983,677, filed on Apr. 24, 2014.

(51) Int. Cl.
*G06F 3/0482* (2013.01)
*G06F 3/0485* (2013.01)
(Continued)

(52) U.S. Cl.
CPC ............. *G09G 5/36* (2013.01); *G06F 1/163* (2013.01); *G06F 3/0488* (2013.01); *G04G 21/025* (2013.01); *G06F 3/0412* (2013.01); *G06F 3/0416* (2013.01); *G06F 3/0485* (2013.01); *G06F 15/0208* (2013.01);
(Continued)

(58) Field of Classification Search
CPC ...... G06F 1/163; G06F 3/0412; G06F 3/0416; G06F 3/0485; G06F 3/0488; G06F 15/0208; G04G 21/025; G09G 2340/14; G09G 2340/145; G09G 2354/00
See application file for complete search history.

(56) References Cited

U.S. PATENT DOCUMENTS

| 7,081,905 B1* | 7/2006 | Raghunath | G04G 5/00 345/684 |
| 2012/0092383 A1* | 4/2012 | Hysek | G04G 21/08 345/684 |

(Continued)

FOREIGN PATENT DOCUMENTS

| JP | 2002-091677 A | 3/2002 |
| JP | 2012-247861 A | 12/2012 |

(Continued)

*Primary Examiner* — Michael J Eurice
(74) *Attorney, Agent, or Firm* — Knobbe, Martens, Olson & Bear LLP

(57) ABSTRACT

An electronic device according to an embodiment including: a sensor to detect a contact position of a touch operation on a screen of a display; a display controller to display, on the screen, first information indicative of a first process to be performed, and to display, on the screen, second information in place of the first information when a moving distance of a contact position of the touch operation exceeds a first value, the second information indicative of a second process to be performed; and a processor to perform the first process when the touch operation finishes while the first information is displayed on the screen and to perform the second process when the touch operation finishes while the second information is displayed on the screen.

15 Claims, 6 Drawing Sheets

(51) Int. Cl.
   *G09G 5/36* (2006.01)
   *G06F 3/0488* (2013.01)
   *G06F 1/16* (2006.01)
   G06F 3/041 (2006.01)
   G06F 15/02 (2006.01)
   G04G 21/02 (2010.01)

(52) U.S. Cl.
   CPC ............... *G06F 2203/04804* (2013.01); *G09G 2340/14* (2013.01); *G09G 2340/145* (2013.01); *G09G 2354/00* (2013.01)

(56) References Cited

U.S. PATENT DOCUMENTS

| | | | | |
|---|---|---|---|---|
| 2013/0044215 A1* | 2/2013 | Rothkopf | ............... | G06F 1/163 348/143 |
| 2013/0191741 A1* | 7/2013 | Dickinson | ............... | G06F 1/163 715/702 |
| 2013/0254705 A1* | 9/2013 | Mooring | ............... | G06F 3/0488 715/784 |
| 2013/0271389 A1* | 10/2013 | Lyons | ............... | G04G 17/083 345/173 |
| 2013/0286435 A1 | 10/2013 | Anezaki et al. | | |
| 2014/0028688 A1* | 1/2014 | Houjou | ............... | G09G 5/006 345/520 |
| 2014/0135631 A1* | 5/2014 | Brumback | ............ | A61B 5/02438 600/479 |
| 2014/0139422 A1* | 5/2014 | Mistry | ............... | G06F 3/014 345/156 |
| 2014/0180595 A1* | 6/2014 | Brumback | ............... | A61B 5/0015 702/19 |
| 2014/0292396 A1* | 10/2014 | Bruwer | ............... | H03K 17/955 327/517 |
| 2014/0347289 A1* | 11/2014 | Suh | ............... | G06F 3/017 345/173 |
| 2015/0074545 A1* | 3/2015 | Anderson | ............... | G06F 1/163 715/747 |
| 2015/0113473 A1* | 4/2015 | Otsuka | ............... | G06F 1/163 715/781 |
| 2015/0121313 A1* | 4/2015 | Lindholm | ............... | G06F 1/163 715/854 |
| 2015/0160621 A1* | 6/2015 | Yilmaz | ............... | G04G 9/0064 368/10 |
| 2015/0160622 A1* | 6/2015 | Kim | ............... | G04G 21/02 368/9 |
| 2015/0185781 A1* | 7/2015 | Yu | ............... | G06F 1/1652 345/173 |
| 2015/0185836 A1* | 7/2015 | Slonneger | ............... | G06F 3/014 345/156 |
| 2015/0189056 A1* | 7/2015 | Magi | ............... | G06F 1/1652 455/566 |
| 2015/0242083 A1* | 8/2015 | Rainisto | ............... | G06F 3/0485 715/784 |
| 2015/0277559 A1* | 10/2015 | Vescovi | ............... | G06F 3/014 345/173 |
| 2015/0293592 A1* | 10/2015 | Cheong | ............... | G06F 3/016 345/173 |

FOREIGN PATENT DOCUMENTS

| | | |
|---|---|---|
| JP | 2013-008326 A | 1/2013 |
| JP | 2013-232047 A | 11/2013 |

* cited by examiner

ELECTRONIC DEVICE, METHOD, AND COMPUTER PROGRAM PRODUCT

CROSS-REFERENCE TO RELATED APPLICATIONS

This application claims the benefit of U.S. Provisional Patent Application No. 61/983,677, filed Apr. 24, 2014.

FIELD

The embodiment described herein relates generally to an electronic device, a method, and a computer program product.

BACKGROUND

Compact-touch-panel-equipped devices (e.g., a wearable terminal) have been widely used that comprise a touch panel display on which a touch operation can be performed. The compact-touch-panel-equipped device displays a user interface (UI) on the touch panel display and executes various types of processes in response to touch operations through the UI.

In the compact-touch-panel-equipped device, the touch panel display has a small area capable of displaying various types of information, thereby limiting the amount of information that can be displayed on the touch panel display.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Typical electronic devices according to an embodiment comprising: a sensor to detect a contact position of a touch operation on a screen of a display; a display controller to display, on the screen, first information indicative of a first process to be performed, and to display, on the screen, second information in place of the first information when a moving distance of a contact position of the touch operation exceeds a first value, the second information indicative of a second process to be performed; and a processor to perform the first process when the touch operation finishes while the first information is displayed on the screen and to perform the second process when the touch operation finishes while the second information is displayed on the screen.

Figure 1:
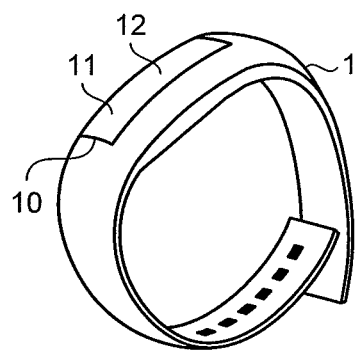
FIG. 1 is an external exemplary view of a wearable device according to an embodiment.
Figure 2:
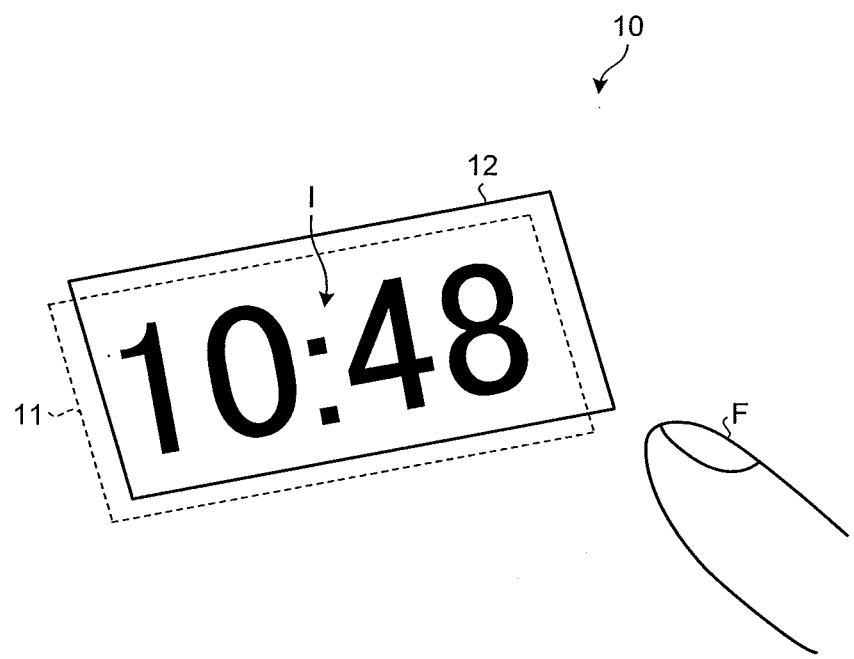
FIG. 2 is an exemplary diagram for explaining a display module comprised in the wearable device in the embodiment.

A wearable device 1 (an example of an electronic device) according to an embodiment, as illustrated in FIG. 1, is wearable on a part of the body of a user. The wearable device 1 can detect biological information of the user (e.g., the amount of activity such as steps taken and calories burned; the body temperature, sweating, pulses, and the state of sleep). The wearable device 1 comprises a display module 10 (an example of a display) configured to comprise a display screen 11 (e.g., a liquid crystal display (LCD) or an organic light emitting display (OLED)) that is an example of a screen capable of displaying thereon various types of information such as notice information I to notify the user of detected results of biological information of the user or time clock information, and a touch sensor 12 (an example of a sensor) configured to detect a touched position P (refer to FIG. 7) that is a position where a touch operation is performed on the display screen 11 of the display module 10, as illustrated in FIGS. 1 and 2. That is, in the present embodiment, the display module 10 and the touch sensor 12 function as what is called a touch panel display.

Figure 3:
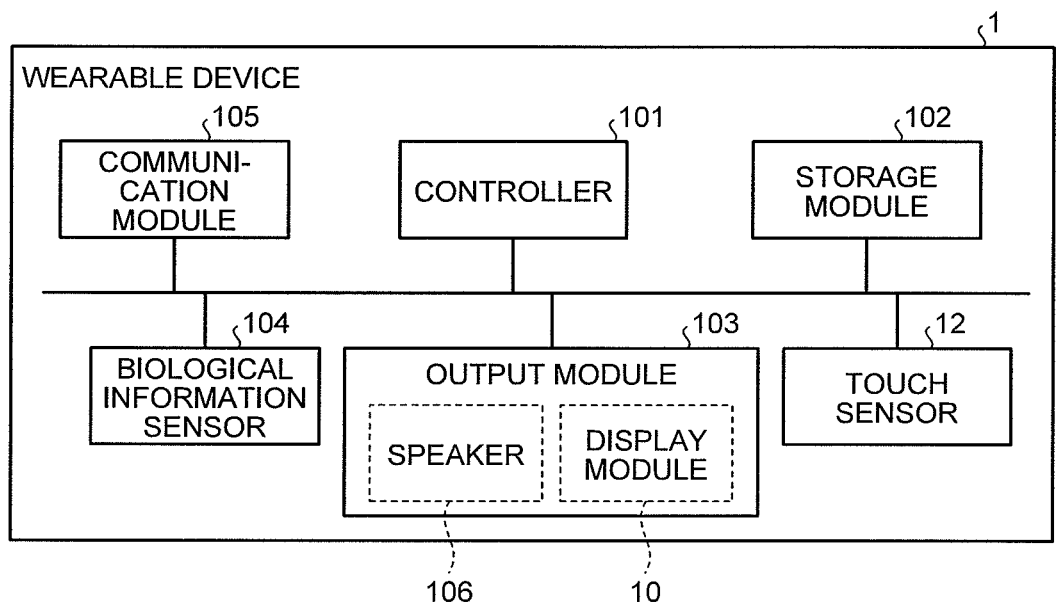
FIG. 3 is an exemplary block diagram of the hardware configuration of the wearable device in the embodiment.

The following describes an example of the hardware configuration of the wearable device 1 according to the embodiment with reference to FIG. 3. The wearable device 1 according to the embodiment, as illustrated in FIG. 3, comprises a controller 101, a storage module 102, the touch sensor 12, an output module 103, a biological information sensor 104, and a communication module 105.

The controller 101 comprises a central process unit (CPU) and controls the components comprised in the wearable device 1. The storage module 102 comprises a read only memory (ROM), and a random access memory (RAM). The storage module 102 can store therein various types of information such as a computer program executed by the controller 101 and data used in the computer program executed by the controller 101.

The touch sensor 12 detects, as described above, the touched position P that is a position where a touch operation is performed on the display screen 11 of the display module 10. The output module 103 comprises the display module 10 which is described above, a speaker 106 capable of outputting audio, and a not-illustrated vibrator. The wearable device 1 notifies the user of various types of information such as the notice information I through display on the display screen 11 of the display module 10, output from the speaker 106, and vibration from the not-illustrated vibrator.

The biological information sensor 104 can detect the biological information (e.g., the amount of activity, the body temperature, sweating, and pulses) of the user who wears the wearable device 1. The communication module 105 can wirelessly communicate with an external device such as a smart phone.

Figure 4:
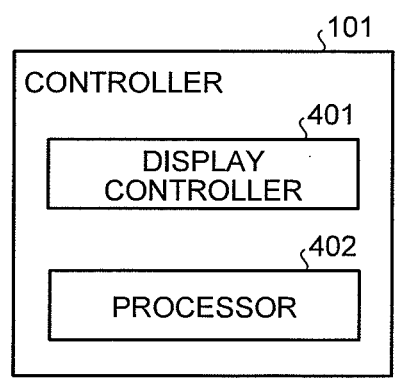
FIG. 4 is an exemplary block diagram of the functional configuration of the wearable device in the embodiment.
Figure 5:
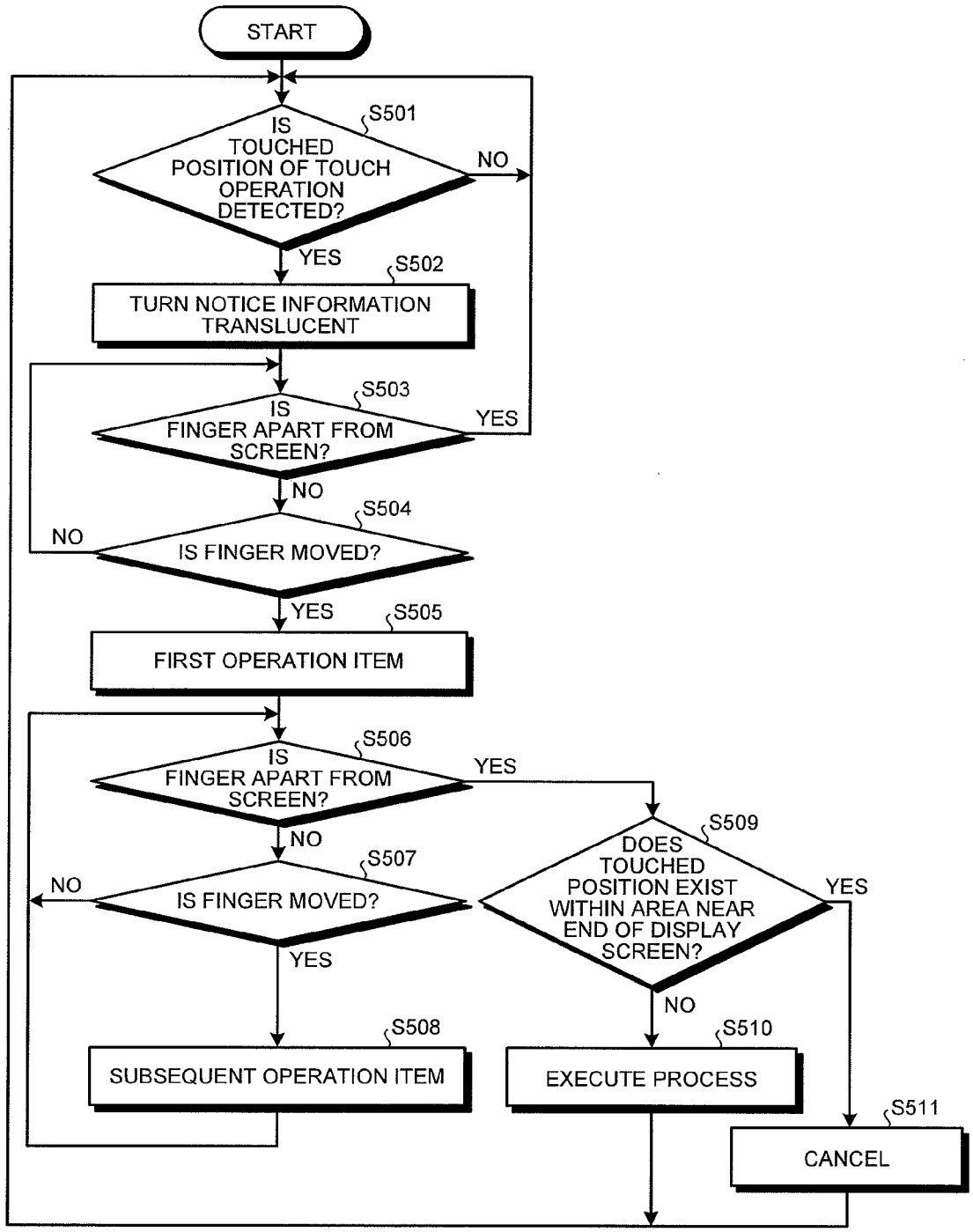
FIG. 5 is an exemplary flowchart of a display process of an operation item in the wearable device in the embodiment.

The following describes an example of the functional configuration of the wearable device 1 according to the embodiment with reference to FIG. 4. The controller 101 of the wearable device 1 in the embodiment, as illustrated in FIG. 4, comprises a display controller 401 and a processor 402. The display controller 401 controls the display screen 11 to display the notice information I thereon. If the touched position P detected by the touch sensor 12 travels when the touch operation on the display screen 11 is not cancelled, the display controller 401 displays a plurality of operation items in a switching manner in a predetermined order (an example of a certain first order) on the display screen 11 according to the moving distance of the touched position P. The operation items correspond to a plurality of processes that are potentially executed, respectively. The operation items are user interfaces to execute the processes and, hereinafter, referred to as operation items i1, i2, i3, . . . , in or simply an operation item i unless they need to be distinguished from each other. In other words, the display controller 401 controls the display screen 11 to display an operation item i (an example of first information) to execute a process (an example of a first process) in response to detection of the touched position P by the touch sensor 12 (i.e., in response to a touch operation). If the moving distance of the touched position P exceeds a certain distance D (an example of a first value) when the touch operation on the display screen 11 is not cancelled, the display controller 401 displays another operation item i (an example of second information) to execute another process (an example of a second process) in place of the operation item i being displayed. The processor 402 executes a process corresponding to at least one of the operation items i displayed on the display screen 11 in response to cancel of the touch operation on the display screen 11. In other words, if a touch operation is cancelled when an operation item i (e.g., an operation item i1) is displayed on the display screen 11, the processor 402 executes the process corresponding to the operation item i1. By contrast, if a touch operation is cancelled when an operation item i2 is displayed on the display screen 11, the processor 402 executes the process corresponding to the operation item i2.

Figure 6:
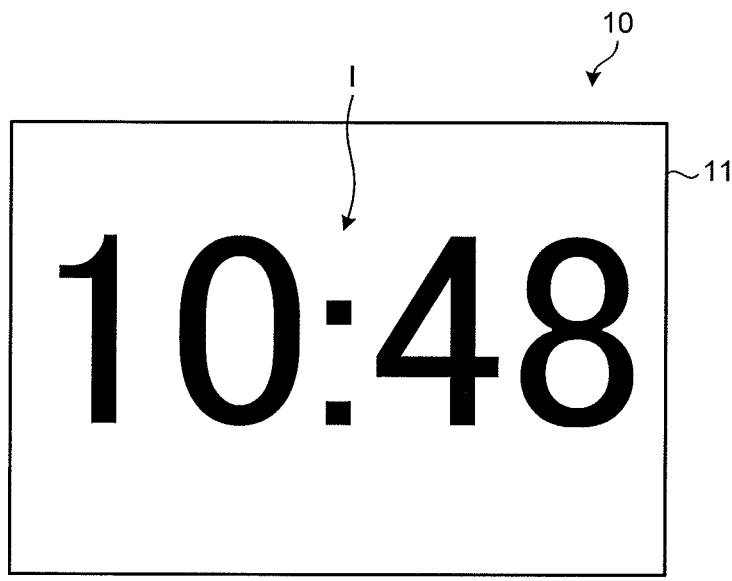
FIG. 6 is an exemplary diagram of notice information in the wearable device in the embodiment.

The following describes an example of a display process of the wearable device 1 according to the embodiment with reference to FIGS. 4 to 10. If the wearable device 1 is powered on, the display controller 401 starts displaying the notice information I on the display screen 11. For example, if the wearable device 1 is powered on, the display controller 401, as illustrated in FIG. 6, displays time clock information as the notice information I on the display screen 11.

While the display controller 401 displays the notice information I on the display screen 11, the display controller 401 determines whether the touch sensor 12 detects the touched position P on the display screen 11 (S501).

Figure 7:
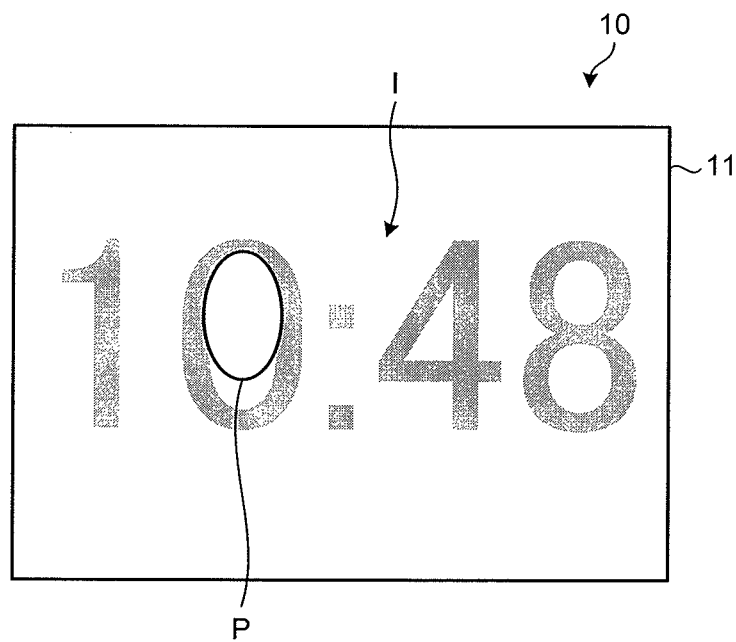
FIG. 7 is an exemplary diagram of notice information in the wearable device in the embodiment.

If the touch sensor 12 detects the touched position P on the display screen 11 (Yes at S501), the display controller 401, as illustrated in FIG. 7, turns the notice information I displayed on the display screen 11 translucent (S502). This enables the display controller 401 to notify the user that the touched position P is detected and the display screen 11 is ready for displaying the operation item i.

In the present embodiment, the display controller 401 turns the notice information I translucent if the touch sensor 12 detects the touched position P. The invention is not limited to this as long as the display controller 401 may change the display mode of the notice information I if the touch sensor 12 detects the touched position P. For example, if the touch sensor 12 detects the touched position P, the display controller 401 may hide the notice information I, blink the notice information I, or change the display color of the notice information I.

After the display controller 401 turns the notice information I translucent and the display screen 11 is ready for displaying the operation item i, the display controller 401 determines whether a finger F that has touched the display screen 11 is now apart from the display screen 11 and thus the touch operation on the display screen 11 is cancelled (S503). If the display controller 401 determines that the touch sensor 12 detects no touched position P and the finger F that has touched the display screen 11 is now apart from the display screen 11 without being moved on the display screen 11 (Yes at S503), that is, if the touch operation on the display screen 11 is cancelled, the display controller 401 cancels the display of the notice information I in translucent on the display screen 11. This enables the display controller 401 to return the display of the notice information I in translucent on the display screen 11 to the original display mode (the display mode of the notice information I as illustrated in FIG. 6).

By contrast, if the display controller 401 determines that the finger F that has touched the display screen 11 is not apart from the display screen 11 (No at S503), the display controller 401 determines whether the finger F that has touched the display screen 11 is moved (S504). In other words, the display controller 401 determines whether the touched position P detected by the touch sensor 12 travels while the touch operation on the display screen 11 is not cancelled.

If the display controller 401 determines that the finger F that has touched the display screen 11 is not moved in the certain distance D (No at S504), that is, if the display controller 401 determines that the touched position P does not travel the certain distance D from the touched position P firstly detected by the touch sensor 12, the process sequence returns to S503. The display controller 401 then determines whether the finger F that has touched the display screen 11 is now apart from the display screen 11.

By contrast, if the display controller 401 determines that the finger F that has touched the display screen 11 is moved in the certain distance D (Yes at S504), that is, if the display controller 401 determines that the touched position P travelled the certain distance D from the touched position P firstly detected by the touch sensor 12, the display controller 401 controls the display screen 11 to display the first operation item i1 in a predetermined order out of the operation items i (S505).

Figure 8:
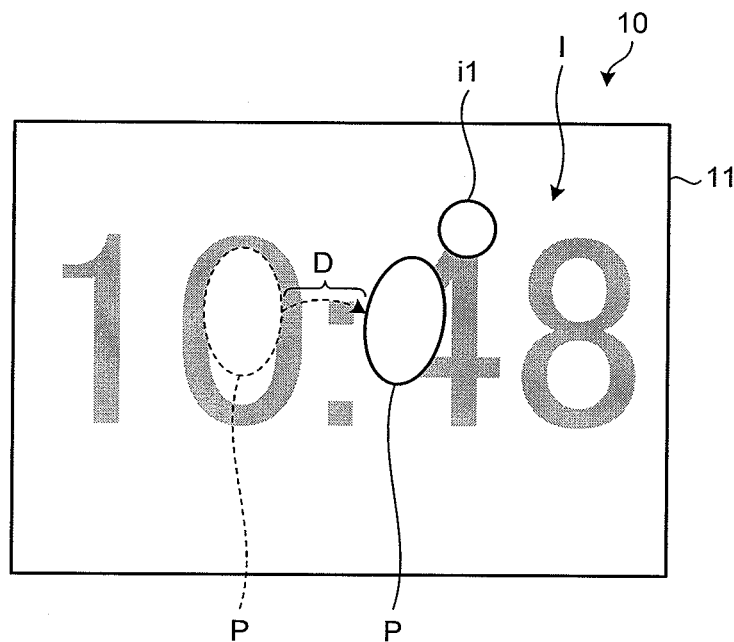
FIG. 8 is an exemplary diagram of an operation item in the wearable device in the embodiment.

In the present embodiment, as illustrated in FIG. 8, if the display controller 401 determines that the touched position P travelled the certain distance D from the touched position P firstly detected, the display controller 401 displays the operation item i (e.g., the operation item i1) near the touched position P and the upper end side of the display screen 11 on the basis of the touched position P detected by the touch sensor 12 in a superimposing manner onto a part of the notice information I (namely, overlay display). In other words, the display controller 401 displays the operation item i in the upper direction from the touched position P on the display screen 11. This prevents the operation item i from being displayed on a position where a user of the wearable device 1 can hardly recognize (e.g., under the finger F performing the touch operation on the display screen 11) if the user performs a touch operation on the display screen 11 to display operation items i on the display screen 11 in a switching manner. This can display the operation item i on a position at which the user of the wearable device 1 can readily recognize.

In the present embodiment, the display controller 401 displays the operation item i near the touched position P. The display controller 401 is simply required to display the operation item i on another position on the upper end side of the display screen 11 on the basis of the touched position P. For example, the display controller 401 may display the operation item i on a certain position on the upper end side of the display screen 11 on the basis of the touched position P.

In the present embodiment, the display controller 401 displays the operation item i in a superimposing manner onto a part of the notice information I. The invention is not limited to this as long as the display controller 401 may display the operation item i in place of at least a part of the notice information I or together with the notice information I. For example, the display controller 401 may display the operation item i in place of the whole of the notice information I or turning the operation item i translucent.

The display controller 401 does not display the operation item i until the touched position P travels the certain distance D from the touched position P if the touch sensor 12 detects the touched position P. This prevents the user to unintendedly touch the display screen 11 of the wearable device 1, thereby preventing the operation item i from being displayed and the process corresponding to the operation item i from being executed.

Referring to FIG. 5 again, after the first operation item i1 is displayed, the display controller 401 determines whether the finger F that has touched the display screen 11 is now apart from the display screen 11 and thus the touch operation on the display screen 11 is cancelled (S506). If the display controller 401 determines that the finger F that has touched the display screen 11 is not apart from the display screen 11 (No at S506), the display controller 401 then determines whether the finger F that has touched the display screen 11 is moved (S507). In other words, the display controller 401 determines whether the touched position P detected by the touch sensor 12 continues travelling without cancelling the touch operation on the display screen 11.

If the display controller 401 determines that the finger F that has touched the display screen 11 is not moved in the certain distance D after the first operation item i1 is displayed (No at S507), that is, if the display controller 401 determines that the touched position P does not travel a certain distance D after the first operation item i1 is displayed, the process sequence returns to S506. The display controller 401 then determines whether the finger F that has touched the display screen 11 is now apart from the display screen 11.

By contrast, the display controller 401 determines that the finger F that has touched the display screen 11 is moved in the certain distance D after the first operation item i1 is displayed (Yes at S507), that is, if the display controller 401 determines that the touched position P detected by the touch sensor 12 travels the certain distance D after the first operation item i1 is displayed, the display controller 401 displays the subsequent second operation item i2 in place of the first operation item i1 out of the operation items i on the display screen 11 (S508). The display controller 401 displays the operation items i on the display screen 11 in a switching manner according to the moving distance of the touched position P regardless of the travelling direction or the travelled position by the finger F that has touched the display screen 11 (the touched position P detected by the touch sensor 12).

This enables the user of the wearable device 1 to display an intended operation item i on the display screen 11 without taking care of the position of the operation item i displayed on the display screen 11 by continuing moving the touched position P until the intended operation item i is displayed. This achieves readily displaying an intended operation item i if the operation item i is displayed on the display screen 11 in a small size that is likely to limit the movement of the finger F of the user.

Figure 9:
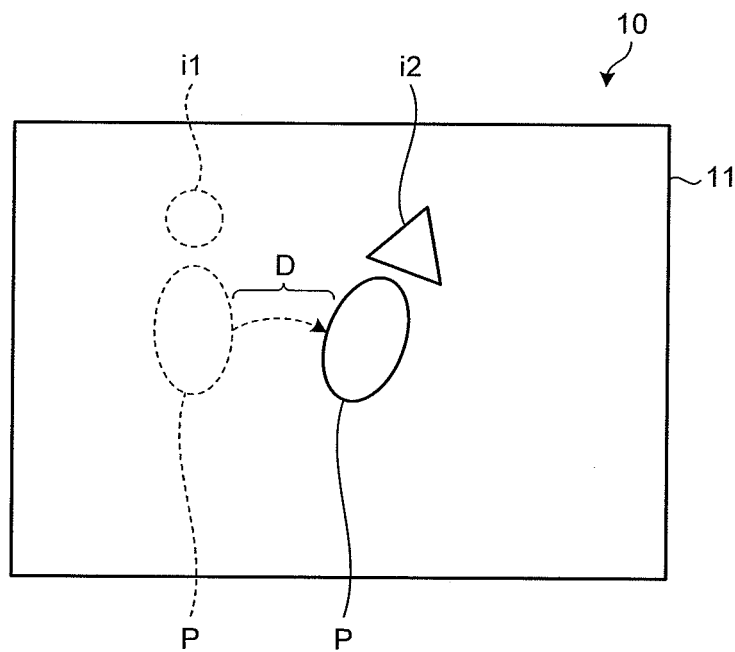
FIG. 9 is an exemplary diagram of an operation item in the wearable device in the embodiment.

In the present embodiment, the display controller 401 displays the operation item i (e.g., the second operation item i2) in place of the first operation item it near the touched position P and the upper end side of the display screen 11 on the basis of the touched position P detected by the touch sensor 12 in a superimposing manner onto a part of the notice information I, as illustrated in FIG. 9, in the same manner as the first operation item i1. This prevents the operation item i from being displayed on a position under the finger F performing the touch operation on the display screen 11 if the user performs a touch operation on the display screen 11 and controls the display screen 11 to display operation items i in a switching manner. This can display the operation item i on a position at which the user who wears the wearable device 1 can readily recognize the item.

In the present embodiment, the display controller 401 doesn't switch the present operation item i to the subsequent present operation item i until the touched position P travels the certain distance D after a certain operation item i is displayed (in other words, if the touched position P travels a distance shorter than the certain distance D after a certain operation item i is displayed). This prevents the operation item i from being switched to the subsequent one displayed on the display screen 11 if the user unintendedly moves the finger F on the display screen 11 without the purpose of switching the operation items i.

The process sequence of the display controller 401 returns to S506, and then the display controller 401 repeats the above-described processes S506 to S508 until the finger F that has touched the display screen 11 is apart from the display screen 11 and thus the touch operation on the display screen 11 is cancelled. Subsequently, after the last operation item "in" out of the operation items is displayed and if the touched position P continues travelling without cancelling the touch operation on the display screen 11, the display controller 401 displays the first operation item i1 again and continues to display the operation items i in the predetermined order according to the moving distance of the touched position P.

If the display controller 401 determines that the finger F that has touched the display screen 11 is now apart from the display screen 11 and thus the touch operation on the display screen 11 is cancelled (Yes at S506), the processor 402 determines whether the touched position P lastly detected by the touch sensor 12 exists within an area near an end of the display screen 11 (S509). If the processor 402 determines that the touched position P lastly detected by the touch sensor 12 does not exist within an area near an end of the display screen 11 (No at S509), the processor 402 executes the process corresponding to the operation item i lastly displayed by the display controller 401 (S510).

In the present embodiment, the processor 402 executes the process corresponding to the operation item i displayed when the touch operation on the display screen 11 is cancelled (i.e., the operation item i lastly displayed by the display controller 401). The invention is not limited to this as long as the processor 402 may execute the process corresponding to at least one of the operation item i out of the plurality of the operation items i displayed on the display screen 11 in response to the cancel of the touch operation on the display screen 11. For example, the processor 402 may execute the process corresponding to the operation item i lastly displayed by the display controller 401 and the process corresponding to the operation items i displayed a certain number before (e.g., one before) the operation items i lastly displayed by the display controller 401 on the display screen 11 in response to the cancel of the touch operation on the display screen 11. This enables the user of the wearable device 1 to execute the intended process by pulling its finger F away from the display screen 11 when the operation item i corresponding to the intended process is displayed. This facilitates the operation to execute the intended process.

Figure 10:
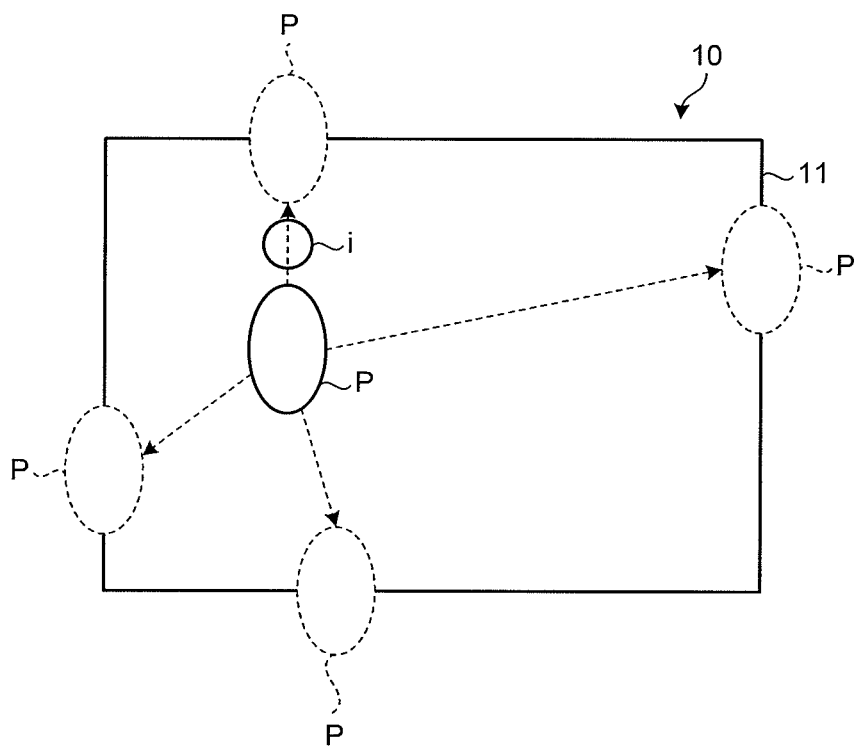
FIG. 10 is an exemplary diagram for explaining an example of a cancel process executed in the wearable device in the embodiment.

By contrast, if the processor 402 determines that the touched position P lastly detected by the touch sensor 12 when the operation item i is displayed on the display screen 11 (the touched position P when the touch operation on the display screen 11 is cancelled) exists within an area near an end of the display screen 11 (Yes at S509) as illustrated in FIG. 10, the processor 402 executes a cancel process to inhibit execution of the process corresponding to the operation item i (S511). That is, if the touched position P when the touch operation on the display screen 11 is cancelled exists within an area near an end of the display screen 11 when the display screen 11 displays the operation item i thereon (Yes at S509), the processor 402 does not execute the process corresponding to the operation item i. If the touch operation on the display screen 11 is cancelled and the touched position P lastly detected by the touch sensor 12 exists within an area near an end of the display screen 11, the display controller 401 ends the display of the operation item i and returns the display mode of the notice information I in the display screen 11 (in the present embodiment, cancels the translucent display of the notice information I).

In the present embodiment, if the touch operation on the display screen 11 is cancelled and the touched position P lastly detected by the touch sensor 12 exists within an area near an end of the display screen 11, the processor 402 executes the cancel process. The invention is not limited to this as long as the processor 402 may execute the cancel process if the touch operation on the display screen 11 is cancelled and the touched position P lastly detected by the touch sensor 12 exists in certain position. For example, the processor 402 may execute the cancel process if the touched position P lastly detected exists within any area near any one of the ends of the display screen 11 or a corner of the display screen 11.

As described above, according to the wearable device 1 in the embodiment, only small number of operation items i need to be constantly displayed on a compact touch panel display, thereby preventing the amount of information of the notice information I from being reduced due to the display of the operation item i on the compact touch panel display.

The display controller 401 may set an order to display the plurality of the operation items i according to the rate of execution (in other words, the rate of selection of the plurality of the operation items i) of the process corresponding to the respective operation items i and display the operation items i in a switching manner according to the order. For example, the display controller 401 sets the order to display the plurality of the operation items i so as to be displayed in the order from the operation item i with the higher rate of execution (in other words, the operation item i with the higher rate of selection).

In the present embodiment, although the display controller 401 displays the plurality of the operation items i in a switching manner in a predetermined order (a first order) according to the moving distance of the touched position P regardless of the travelling direction, the invention is not limited to this. Alternatively, if the travelling direction of the touched position P is changed from a first direction (e.g., clockwise rotation) to a second direction that is reverse to the first direction (e.g., counterclockwise rotation), the display controller 401 may display the plurality of the operation items i in a switching manner in the reverse order of the predetermined order (an example of a second order) on the basis of the operation item i lastly displayed. In other words, if the touched position P travels while the touch operation on the screen is not cancelled, in the direction reverse to the direction from the touched position P when a certain operation item i (e.g., the operation item i1) is displayed to the touched position P when the subsequent operation item i (e.g., the operation item i2) is displayed, the display controller 401 displays the operation item i1 in place of the operation item i2.

In the present embodiment, although if a certain operation item in is displayed, the display controller 401 hides (deletes) the operation item in−1 displayed one before the operation item in, the invention is not limited to this. Alternatively, if a certain operation item in is displayed, the display controller 401 may continue displaying the operation item in−1 displayed a given number (e.g., one) before the operation item in without hiding (deleting) it.

In the present embodiment, although the display controller 401 displays the plurality of the operation items i in a switching manner according to only the moving distance of the touched position P, the invention is not limited to this. Alternatively, the display controller 401 may display the operation items i in a switching manner according to the time period of continuation of the touch operation on the display screen 11 without being cancelled. For example, the display controller 401 switches the operation item in to the subsequent operation item in+1 if the moving distance of the touched position P does not reach a certain distance required for switching to the subsequent operation item in+1 within a predetermined time. In other words, the display controller 401 displays the operation item in+1 in place of the operation item i if the moving distance of the touched position P does not exceed a certain distance D within a predetermined time (an example of a first time) period after a certain operation item in is displayed when the touch operation on the display screen 11 is not cancelled.

In the present embodiment, although if the touch operation on the display screen 11 is cancelled and the touched position P lastly detected by the touch sensor 12 has moved to an area near an end of the display screen 11, the processor 402 inhibits the process corresponding to the operation item i, the invention is not limited to this. For example, the display controller 401 displays the operation item i corresponding to the process to inhibit execution of the process corresponding to the operation item i on the display screen 11 as one of the operation items i displayed in a switching manner. If the operation item i displayed when the touch operation on the display screen 11 is cancelled is the operation item i corresponding to the cancel process, the processor 402 can execute the cancel process.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An electronic device comprising:
   a display;
   a sensor to detect a contact position of a touch operation on a screen of the display; and
   a hardware processor configured to:
   display, on the screen, a first indication of a first process when a time period of continuation of the touch operation on the screen exceeds a first period and does not exceed a second period, wherein the second period is longer than the first period,
   display, on the screen, a second indication of a second process in place of the first indication when the time period of continuation of the touch operation on the screen exceeds the second period and does not exceed a third period, wherein the third period is longer than the second period;
   perform the first process in response that the touch operation finishes and the time period of continuation of the touch operation on the screen exceeds the first period and does not exceed the second period; and
   perform the second process in response that the touch operation finishes and the time period of continuation of the touch operation on the screen exceeds the second period and does not exceed the third period.

2. The electronic device of claim 1, wherein the hardware processor is configured to display, on the screen, the first indication in place of the second indication when a contact position of the touch operation travels while the touch operation on the screen does not finish, in an opposite direction from a contact position of the touch operation when the first indication is displayed to a contact position of the touch operation when the second indication is displayed.

3. The electronic device of claim 1, wherein the hardware processor is configured not to perform the first process or the second process when a contact position of the touch operation exists within an area near an end of the screen when the touch operation on the screen is finished while the first indication or the second indication is displayed on the screen.

4. The electronic device of claim 1, wherein the hardware processor is configured to display the first indication or the second indication in a position in an upper direction from a position where the touch operation is performed on the screen of the display.

5. The electronic device of claim 1, wherein the hardware processor is configured to display the second indication in place of the first indication when a moving distance of a contact position of the touch operation does not exceed the first value within the second period after the first information is displayed while the touch operation on the screen is not finished.

6. A method comprising:
   detecting a contact position of a touch operation on a screen on a display;
   displaying, on the screen, a first indication of a first process when a time period of continuation of the touch operation on the screen exceeds a first period and does not exceed a second period, wherein the second period is longer than the first period,
   displaying, on the screen, a second indication of a second process in place of the first indication when the time period of continuation of the touch operation on the screen exceeds the second period and does not exceed a third period, wherein the third period is longer than the second period;
   performing the first process in response that the touch operation finishes and the time period of continuation of the touch operation on the screen exceeds the first period and does not exceed the second period; and
   performing the second process in response that the touch operation finishes and the time period of continuation of the touch operation on the screen exceeds the second period and does not exceed the third period.

7. The method of claim 6, wherein the displaying includes displaying, on the screen, the first indication in place of the second indication when a contact position of the touch operation travels while the touch operation does not finish, in an opposite direction from a contact position of the touch operation when the first indication is displayed to a contact position of the touch operation when the second indication is displayed.

8. The method of claim 6, wherein the performing includes not performing the first process or the second process when a contact position of the touch operation exists within an area near an end of the screen when the touch operation on the screen is finished while the first indication or the second indication is displayed on the screen.

9. The method of claim 6, wherein the displaying includes displaying the first indication or the second indication in a position in an upper direction from a position where the touch operation is performed on the screen of the display.

10. The method of claim 6, wherein the displaying includes displaying the second indication in place of the first indication when a moving distance of a contact position of the touch operation does not exceed the first value within the second period after the first information is displayed while the touch operation on the screen is not finished.

11. A computer program product having a non-transitory computer readable medium including programmed instructions, wherein the instructions, when executed by a computer, cause the computer to perform:
   detecting a contact position of a touch operation on a screen on a display;
   displaying, on the screen, a first indication of a first process when a time period of continuation of the touch operation on the screen exceeds a first period and does not exceed a second period, wherein the second period is longer than the first period;
   displaying, on the screen, a second indication of a second process in place of the first indication when the time period of continuation of the touch operation on the screen exceeds the second period and does not exceed a third period, wherein the third period is longer than the second period;
   performing the first process in response that the touch operation finishes and the time period of continuation of the touch operation on the screen exceeds the first period and does not exceed the second period; and
   performing the second process in response that the touch operation finishes and the time period of continuation of the touch operation on the screen exceeds the second period and does not exceed the third period.

12. The computer program product of claim 11, wherein the displaying includes displaying, on the screen, the first indication in place of the second indication when a contact position of the touch operation travels while the touch operation on the screen does not finish, in an opposite direction from a contact position of the touch operation when the first indication is displayed to a contact position of the touch operation when the second indication is displayed.

13. The computer program product of claim 11, wherein the performing includes not performing the first process or the second process when a contact position of the touch operation exists within an area near an end of the screen when the touch operation on the screen is finished while the first indication or the second indication is displayed on the screen.

14. The computer program product of claim 11, wherein the displaying includes displaying the first indication or the second indication in a position in an upper direction from a position where the touch operation is performed on the screen of the display.

15. The computer program product of claim 11, wherein the displaying includes displaying the second indication in place of the first indication when a moving distance of a contact position of the touch operation does not exceed a first value within the second period after the first information is displayed while the touch operation on the screen is not finished.

* * * * *